Dec. 12, 1961  F. A. NUNN  3,013,140
APPARATUS FOR MAKING ELECTRICAL CAPACITORS
Filed March 4, 1959

United States Patent Office 3,013,140
Patented Dec. 12, 1961

3,013,140
APPARATUS FOR MAKING ELECTRICAL
CAPACITORS
Francis A. Nunn, Blakesley, near Towcester, England, assignor to The Plessey Company Limited, Ilford, England, a British company
Filed Mar. 4, 1959, Ser. No. 797,308
4 Claims. (Cl. 219—19)

This invention relates to electrical capacitors and has for its object to provide an improved method of constructing and manufacturing such capacitors.

In our co-pending United States application No. 710,381 we have described a method of constructing an electrical capacitor by providing a series of elements; these elements each consist of a short length of dielectric material having on one side thereof a layer of conductive material. Conveniently, the material can be paper or a plastic sheet material, and the conductive layer can be provided by metallisation. The conductive layer does not extend to the full width of the dielectric strip but in manufacture, where the elements are formed from continuous strip material it is easier to arrange if the conductive layer extends to the ends of each element. The elements are folded each about their centre line and are interleaved from opposite directions.

With the construction of capacitor of the kind described there will be two thicknesses of dielectric material between each adjacent conductive layer, except at the ends of each element. In consequence, the insulation of the capacitor is slightly reduced at these points and it is an object of the present invention to overcome this defect.

In accordance with the invention the ends of each element are free of conductive layer to a distance which is at least as great as the thickness of the dielectric material and conveniently slightly more.

The invention also provides an apparatus for effecting the desired freeing of the dielectric material from the conductive layer when the dielectric is supplied in continuous strip form, and is provided with a metallized or similar layer, and the invention also includes an apparatus for manufacturing an electrical capacitor comprising two series of doubled and alternately interleaved elements, said apparatus comprising means for severing elements from continuous strip material, said strip material comprising a thin dielectric material having a conductive layer applied thereto, said apparatus further comprising means for removing said conductive layer from said dielectric material adjacent the position of the severing of the strip.

Other features and advantages of the invention will appear from the following description of embodiments thereof in conjunction with the accompanying drawings in which:

FIGURE 1 is a plan view of a length of dielectric material before it is formed into one of the elements, FIGURE 2 is a perspective view of one of the folded elements, FIGURE 3 is a diagram showing the arrangement of two series of dielectric elements, and the electrodes, in a capacitor in accordance with the invention, and FIGURE 4 is a diagram showing the arrangement of a machine suitable for making capacitor assemblies of the kind indicated in FIGURE 1.

A capacitor is made, in this embodiment of the invention, from continuous strip dielectric material 10, such as paper or polystyrene; if paper is used, the paper can be lacquered to improve its dielectric properties. To one side of the dielectric strip is applied a conducting layer 11, such as zinc or aluminium, applied by vacuum or thermal deposition or otherwise as may be convenient. The deposit can extend up to both edges of the strip but it is preferred to leave marginal uncoated portions 12, to increase the insulation resistance of the finished capacitor.

The coated dielectric strip is cut into short lengths by straight, transverse cuts; while the proportions of the cut lengths thus produced are not critical, it is convenient if the length is approximately twice the width. These portions of coated strip are then each folded about the transverse centre line at 13, into a doubled form, with the electrode coating 11 on the outside. In this way there are formed a series of elements, as shown in FIGURE 2. In accordance with a feature of the invention, the ends of the elements are freed of metallising at 14.

Two series of these elements are alternately interleaved in the manner shown in FIGURE 3; FIGURE 3 is diagrammatic and not to scale. The left hand series of elements 15 are interengaged alternately with those of the right hand series 16. Since the electrode coatings are on the outside of each element and the uncoated surfaces are on the inside it will be seen, firstly, that there is a continuous conductive connection between all the elements 15 and a similar conductive connection between all elements 16, but no connection between the two series of elements. Further, it will be observed that the electrode surface on any element of one series is separated from any element of the other series by at least two thicknesses of the dielectric material, with consequent improvement of the insulation resistance of the final capacitor; this is especially advantageous where a metallised dielectric is used. There will not be two thicknesses of dielectric at the extreme ends of the strips and adjacent the folds 13, but the removal of the metallising at the regions 14 of the elements provides an adequate degree of insulation. The extent of the areas 14 in the direction of the length of the strip will be determined by the degree of insulation required. This extent will be at least equal to the thickness of the strip but as a matter of convenience is rather more.

FIGURE 4 shows diagrammatically an arrangement suitable for preparing the elements from a continuous strip of the metallised dielectric.

The dielectric strips 20, 21 are fed respectively from two rolls 22, 23. The strip 20 passes between the nip of two rolls 24, 25, but strip 21 passes first over a jockey roller 17, thence over a further roller 18 before passing between the nip of two rolls 26, 27. An idler roller 19 is arranged between rollers 18 and 27.

The purpose of rollers 17, 18 and 19 is to remove the metallising from the areas 14 of the strips, and to this end the roller 18 is arranged in engagement with the metallized surface of the dielectric, the roller 18 having a series of transverse wires 18a in its surface; the wires are arranged parallel to the axis of the roller. These wires are heated by means of an electric current passed through them and they are arranged to contact the metallized surface of the dielectric. It is also arranged that roller 18 moves at a slightly different peripheral speed to the dielectric strip; this is effected by making the diameter of roller 18 differ very slightly in diameter from that of roller 27. As a result there is a measure of burning and scraping action which takes place, sufficient to remove the metallizing for a short distance. The extent of the metallizing removed can be controlled by varying the angular extent of the roller with which the dielectric strip is in contact, by movement of the jockey roller 17.

Rolls 25 and 27 have a comparatively yielding surface, such as leather; rolls 24 and 26 have on their surfaces small transverse projections 28, 29. These small projections produce spaced, shallow grooves in the dielectric strips, as indicated at 30, 31.

The strips are advanced until they lie over slotted platens 32, 33 and are then cut by knives at 34, 35 into the required lengths. It is arranged by suitable timing of the machine that the strip is severed precisely in the centre of the unmetallised areas 14 of the strip.

When the strips are in position over platens 32, 33, a groove 30 or 31 lies over the slot in the corresponding platen. Pusher arms 36, 37 push the cut lengths of dielectric through the slots in the platens, into the nip of pairs of driven rollers 38, 39 and 40, 41. When the pushers are depressed, they locate themselves in the creases or grooves 30, 31 of the cut lengths of dielectric and this ensures that they are fed accurately into the rolls.

Beneath rolls 38, 39 and 40, 41, are two toothed wheels 42, 43 and as the cut and now doubled length of dielectric emerges from the rolls it drops into a space between two teeth, and is there held by suction. The two toothed wheels rotate in the directions indicated by arrows 44, 45 thereby causing the lengths of dielectric to become interleaved. When this interleaved suction on the teeth is released, and a stack of elements emerges from the wheels 40, 41 and is guided by guide 46 on to a transfer conveyor 47. Preferably, in the manner described in our copending British application No. 32,913/57, further pairs of rollers, with an adjustable nip, are located beneath the pairs of rollers 38, 39 and 40, 41, in order to ensure that the folded strips drop cleanly into the teeth of the wheels 42, 43.

Means are provided for inserting marking strips, to mark the end of a desired length of stack of elements. Marker material 48, 49 such as card, from reels 50, 51 is cut into lengths at 52, 53 and are inserted into the teeth of wheels 40, 41. The capacitors can then be compressed, and suitably electroded impregnated and cased.

What I claim is:

1. Apparatus for removing areas of metallised electrode material from a strip of metallised dielectric material, which strip material is to be formed into a capacitor comprising two series of interleaved elements of the strip material, comprising means for severing the strip material into predetermined lengths, a rotatable element positioned in the path of advance of the strip material to the severing means, a raised heating element on the rotatable element and extending transversely of the strip material, the heating element being capable of making rubbing contact with the strip material, and means for varying the angle of contact between the strip material and the rotatable element whereby the extent, along the length of the strip material, of the area of the metallising removed is selectively variable.

2. Apparatus for removing areas of metallised electrode material from a strip of metallised dielectric material, which strip material is to be formed into a capacitor comprising two series of interleaved elements of the strip material, comprising means for severing the strip material into predetermined lengths, drive means for advancing the strip to the severing means, a rotatable element positioned in the path of advance of the strip material to the severing means, a raised heating element on the rotatable element extending transversely of the strip material, the heating element being capable of making rubbing contact with the strip material, means for driving the roller from the strip advancing means and a jockey roller engaging the strip material in advance of the further roller, the jockey roller being bodily displaceable relative to the further roller whereby the angle of contact between the strip material and the rotatable element can be varied so that the extent, along the length of the strip material, of the area of the metallising removed is varied.

3. Apparatus for removing areas of metallised electrode material from a strip of metallised dielectric material, which strip material is to be formed into a capacitor comprising two series of interleaved elements of the strip material, comprising means for severing the strip material into predetermined lengths, a drive means including a feed roller for advancing the strip material to the severing means, a rotatable further roller positioned in the path of advance of the strip material to the severing means, the further roller being driven from a drive including the feed roller in such manner as to produce a constant differential velocity therebetween, a raised heating element on the further roller extending transversely of the strip material, the heating element being capable of making rubbing contact with the strip material, and means for varying the angle of contact between the strip material and the rotatable element whereby the extent, along the length of the strip material, of the area of the metallising removed is varied.

4. Apparatus for removing areas of metallised electrode material from a strip of metallised dielectric material, which strip material is to be formed into a capacitor comprising two series of interleaved elements of the strip material, comprising means for severing the strip material into predetermined lengths, a strip feed roller for advancing the strip material to the severing means, a rotatable further roller positioned in the path of advance of the strip material to the severing means, a raised heating element on the roller extending transversely of the strip material, the further roller being connected to received drive from the feed roller, the feed roller and the further roller each having a strip engaging periphery, the periphery of the further roller being of a smaller diameter than that of the feed roller, whereby a constant differential velocity is produced between the further roller and the strip material whereby the heating element makes a slipping rubbing contact with the strip material, a jockey roller engaging the strip material in advance of the further roller, the jockey roller being positionably displaceable to vary the angle of contact between the strip material and the rotatable element whereby the extent, along the length of the strip material, of the area of the metallising removed is varied.

References Cited in the file of this patent

UNITED STATES PATENTS

| | | |
|---|---|---|
| 2,399,798 | Grouse et al. | May 7, 1946 |
| 2,502,310 | Chapman | Mar. 28, 1950 |
| 2,569,414 | Godley et al. | Sept. 25, 1951 |
| 2,597,511 | Mellen et al. | May 20, 1952 |
| 2,703,857 | Engelhardt et al. | Mar. 8, 1955 |
| 2,716,180 | Dubilier | Aug. 23, 1955 |
| 2,917,613 | Forshaw et al. | Dec. 15, 1959 |